Nov. 5, 1940.  E. F. KERKHOFF  2,220,343
POSITIVE VARIABLE SPEED DRIVE
Filed April 27, 1939  3 Sheets-Sheet 1

INVENTOR
EDWARD F. KERKHOFF,
By Minturn & Minturn,
ATTORNEYS

Patented Nov. 5, 1940

2,220,343

UNITED STATES PATENT OFFICE 2,220,343

POSITIVE VARIABLE SPEED DRIVE

Edward F. Kerkhoff, Indianapolis, Ind.

Application April 27, 1939, Serial No. 270,314

2 Claims. (Cl. 74—424.5)

This invention relates to a positive variable speed drive wherein there may be no slippage between shiftable elements within the drive. I am aware of the fact that variable speed drives have been proposed heretofore wherein two opposing disks, one a driving disk and the other a driven disk, were frictionally interconnected by one or more intervening rollers contacting the two disks with considerable pressure so that the drive from one disk to the other would be taken through such rollers dependent upon friction. Also I am aware that in some cases these disks have been provided with annularly disposed teeth in steps to have the intervening roller also toothed to be shifted from one step to the other.

In my invention, however, I propose to employ a continuous tooth arrangement whereby as the intervening element is shifted, it will be maintained in constant mesh with the teeth of the two opposing disks regardless of this degree of shifting so that there will be at all times a positive drive from one disk to the other.

An important advantage of the invention resides in its extreme simplicity with a minimum number of parts insuring a calculable driven speed when the driving speed is known.

Figure 1:
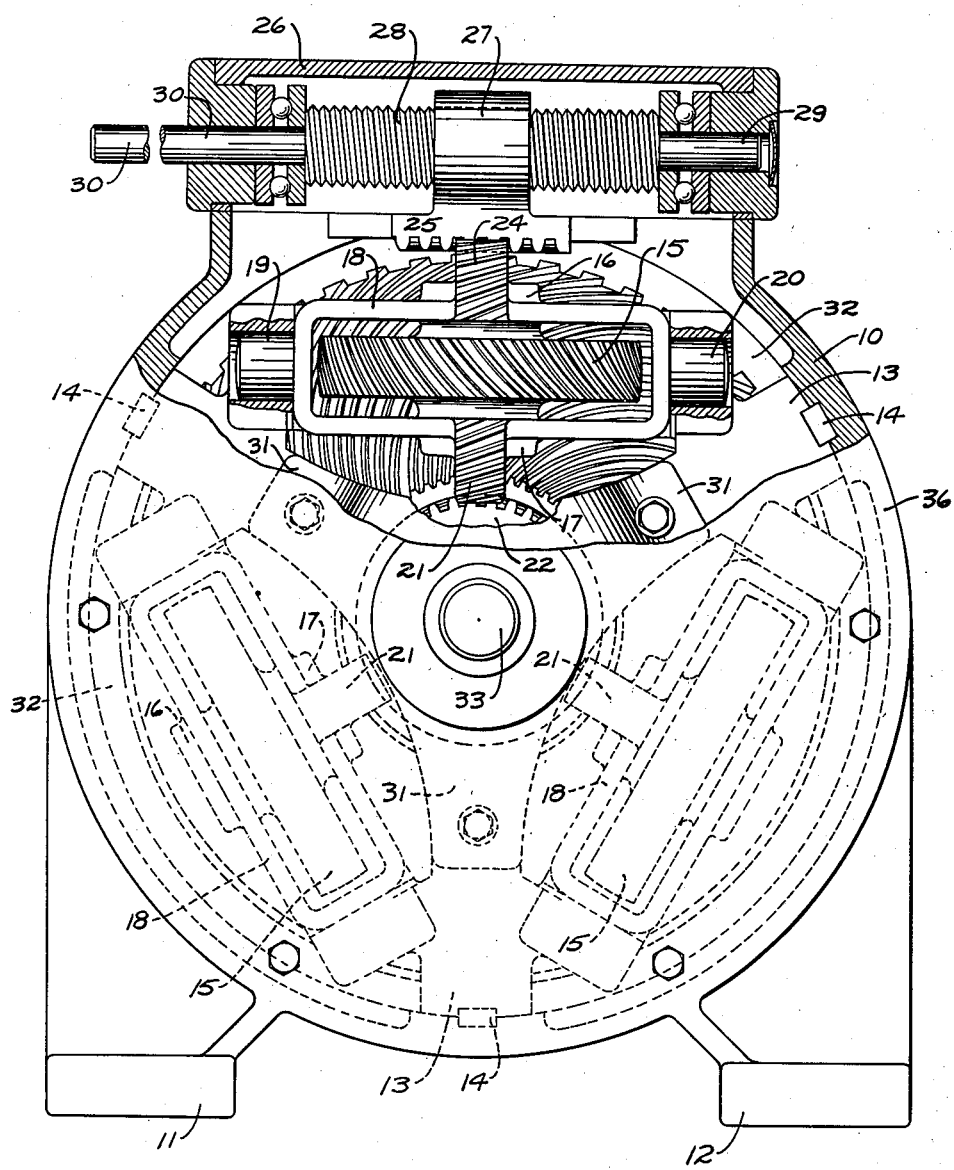
Figure 2:
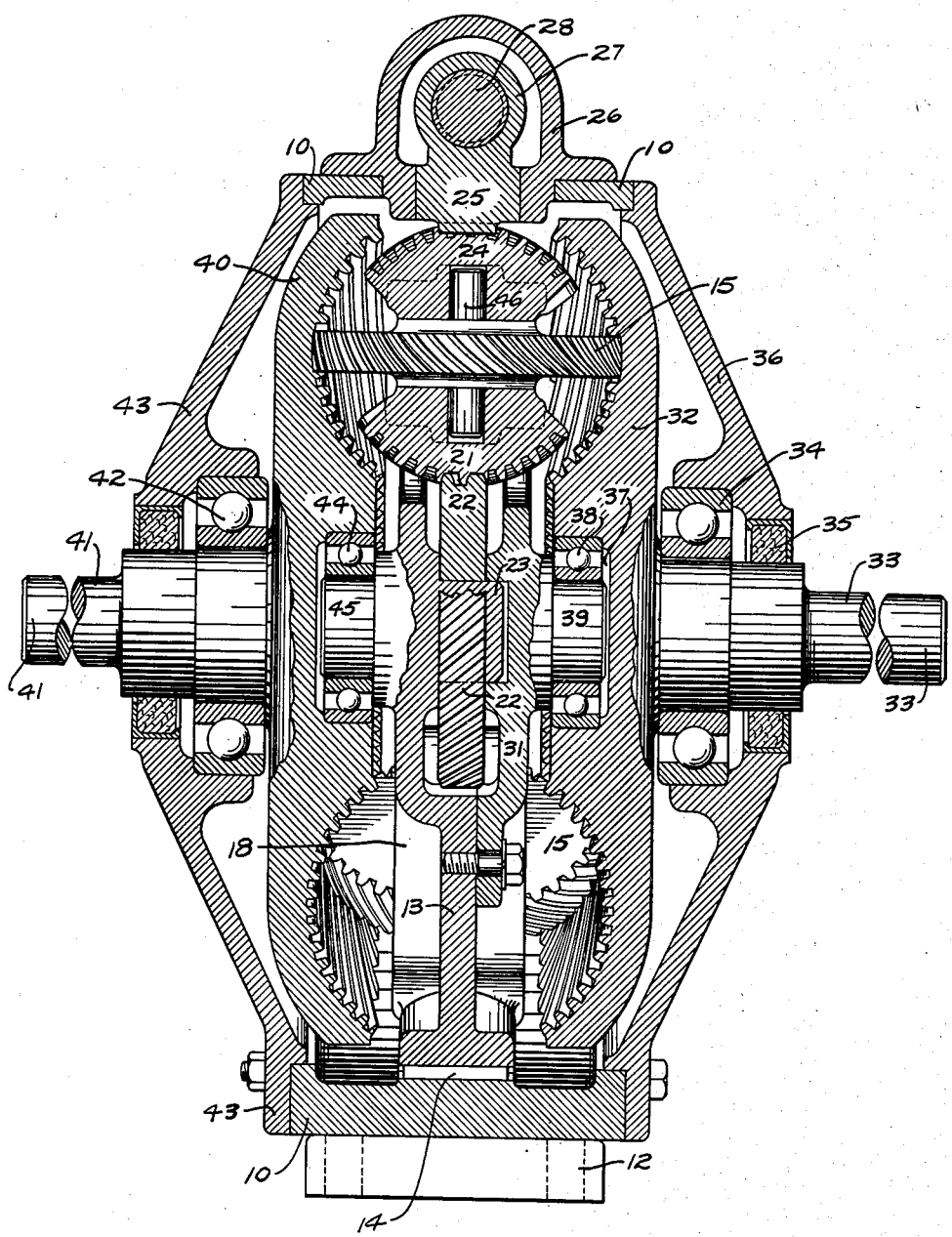

These and other important objects and advantages of the invention will become apparent to those versed in the art in the following description of one particular form of the invention as illustrated in the accompanying drawings, in which Fig. 1 is a side elevation in partial section of a structure embodying the invention;

Fig. 2, a central, vertical, longitudinal section; and

Figure 3:
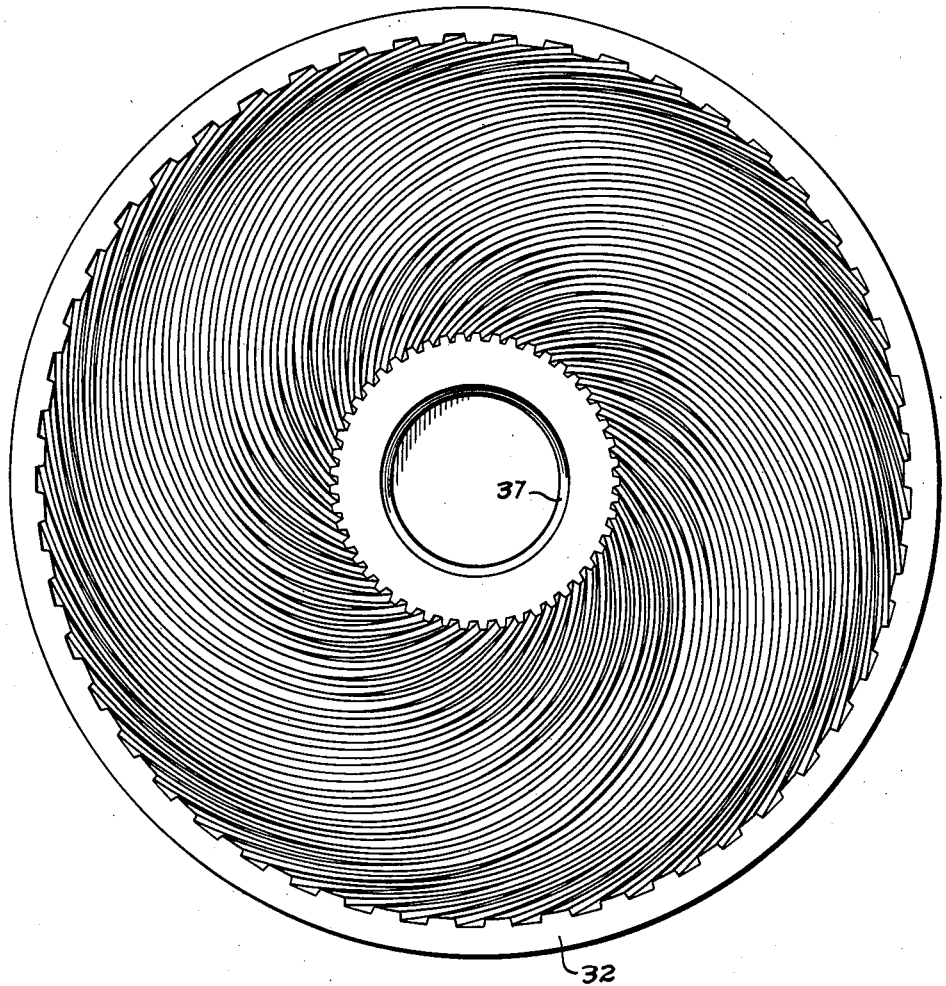

Fig. 3, an elevation of the tooth side of one of the major disks.

Like characters of reference indicate like parts throughout the several views in the drawings.

I form a central ring housing 10 to be supported in any suitable manner such as by the pedestals 11 and 12. A spider 13, herein shown as having three legs, is entered from one side of the housing to have each leg keyed through a key 14 to the housing ring to maintain the spider in fixed position in relation to the ring.

A plurality of spur gears 15, herein shown as three in number, are rockably carried between each of the adjacent legs of the spider 13. As indicated in Figs. 1 and 2, each spur gear 15 is mounted upon an axle 46 which is supported by and free to turn in transversely positioned bearings 16 and 17 provided by the gear carrier 18. The carrier 18 has end trunnions 19 and 20 rotatably carried in bearings extending from the legs of the spider 13, so that the carrier 18 is free to rock on an axis perpendicular to the plane of the gear 15 while the gear 15 is free to turn through its axle 46 on an axis passing through the center of the spider.

The degree of rotation of the carriers 18 is determined by a simple expedient. Each of the carriers 18 carries an inner gear segment 21 which is in constant mesh with a central spur gear 22 that is carried on a stub shaft 23, herein shown as an integral part of the spider 13. By this means, all three carriers 18 are fixed in position, one relative to the other. The teeth on the gear segments 21 and on the gear 22 are arranged to be such that when one of the carriers 18 is rocked, its gear segment will revolve the spur gear 22 about its shaft 23 and thereby in turn rock the other two carriers accordingly.

In the form herein shown, the upper gear 15 is horizontally disposed and its carrier 18 carries a second gear segment 24 which is in constant mesh with the teeth of a rack gear 25. This rack gear 25 is slidingly guided through a slot in the floor of a cap 26 which is mounted on an upwardly extending part of the housing ring 10. An eye 27 extends upwardly from the rack gear 25 to have a screw-threaded shaft 28 pass therethrough in screw-threaded engagement. This shaft 28 has trunnions 29 and 30 of reduced diameters at its respective ends carrying appropriate thrust bearings and radial bearings whereby rotation of the shaft 28 through the externally projecting trunnion 30 will turn the shaft 28 and thereby advance or retract the eye 27 to carry the rack gear 25 to and fro across the gear segment 24. The teeth are diagonally positioned as between these two gear members so that the movement of the rack gear 25 will cause rotary movement of the gear segment 24 and thereby shift not only the top carrier 18 but also the other two carriers interconnecting therewith through the spur gear 22. Preferably a spider cover 31 is provided to engage over the stub shaft 23 and provide an abutment for the gear 22 so as to maintain that gear in a central aligned position.

A disk-like member 32 is provided with a stepped shaft 33 to carry a suitable bearing, herein shown as a ball bearing 34, capable of taking end thrust, and an outer oil retaining packing ring 35. A housing end plate 36 is formed to fit around the outer side of the housing ring 10 and carry the bearing 34 as well as the packing 35.

This disk member 32 is preferably provided with a central bore 37 within which is carried a bearing, herein shown as a ball bearing 38, that receives a stub shaft 39 extending integrally from the spider cover plate 31.

On the inner face of the disk 32 is formed an annularly depressed portion, the arc of this depressed portion being a part of a circle whose center would be at the exact center of any one of the gears 15. This concave annular portion is not left smooth but is cut to form teeth in the nature of a spiral gear although at any point on any one of the teeth so cut the thickness of the tooth is constant and the distance apart of the teeth is constant in respect to all of the other teeth when measured at any point normal to a tangent at that point. These teeth are cut by revolving the disk 32 on its own axis through the center of the shaft 33 while a cutter is revolved on the axis of the gear 15, the axis of the cutter being rocked in parallel relation to the disk 32 during the cutting operation. This will give a longitudinal curving of tooth as indicated in Fig. 3 wherein the ends of the teeth as appearing at the central part of the disk 32 will have narrower terminal cross sections on the gear face than they will have at the outer tooth ends by reason of the difference in angularity of the teeth as between those two locations, assuming that the cutter revolves once on its axis while the disk makes one revolution. Different angularities of the disk teeth will be had by varying this relative speed and rocking of the cutter. The central area peripherally bounded by the inner terminal ends of the teeth has a diameter preferably made to equal the distance from that peripheral boundary to the outer peripheral boundary of the terminal ends of the teeth at the outer end of the annular channel.

A second disk member 40 has an integrally extending stepped shaft 41 supported by a thrust ball bearing 42 carried in the opposite end plate 43 that is fixed to the other side of the ring housing 10. The inner face of this disk 40 has a counterbore in which is positioned a ball bearing 44 that centrally receives the stub shaft 45 that extends integrally and centrally from the side of the spider 13. The two shafts 33 and 41 are axially aligned one with the other and the disks 32 and 40 are carried into meshing engagement on the opposite respective sides of the intervening gears 15. The disk 40 has its teeth disposed in opposite angular relation to the teeth of the disk 32.

Now assuming that the shaft 33 is the driving shaft, and that the gears 15 are each positioned as indicated in Figs. 1 and 2, those gears will be turned by reason of their meshing with the disk teeth and will cause the disk 40 to be revolved in the opposite direction at the same speed as that of the disk 32 to in turn cause the shaft 41 to turn at the same speed as that of the shaft 33. By operating the extending trunnion member 30 to shift the rack gear 25 and rock the carriers of the various gears 15, the right-hand side of the upper gear 15, Fig. 2, may be dropped to cause the other side to be raised. The other gears would, of course, be correspondingly shifted. Then the speed of the disk 40 is decreased in relation to the speed of the disk 32. Of course, the opposite condition may prevail by shifting the gears 15 accordingly. Therefore, it is to be seen that as the gears 15 may be shifted into positions to bring their peripheries nearer the hub of one disk and nearer the periphery of the other, a variation in speed between those two disks will be obtained, all without disengaging the intervening gears 15 from the teeth of the two opposing disks. This is made possible by the peculiarly formed teeth in the concave portions of the opposed disks.

While I have herein shown and described my invention in the one best form as now known to me, it is obvious that structural changes may be employed, such, for example, as in the particular means for shifting the gears 15, the means for mounting the opposing disks, and the like, all without departing from the spirit of the invention and I, therefore, do not desire to be limited to that precise form beyond the limitations as may be imposed by the following claims.

I claim:

1. A pair of axially aligned, spaced apart shafts, a driving member fixed to one shaft, a driven member fixed to the other shaft, each of said members having an opposing groove therearound, the cross-sectional contour of each of which grooves constitutes an arc of a common circle, both of said grooves being provided with substantially spiral teeth across their faces, means maintaining both of said members a fixed distance apart, at least one spur gear between said members to have teeth on the spur gear in constant mesh with both the driven and driving member groove teeth, a spur gear carrier on which the spur gear may rotate about its own axis, the line of said axis being angularly disposed to the axis of said shafts and remaining in a plane including the shaft axis, and means for rocking said carrier to shift said spur gear axis within said plane whereby a positive worm type drive is had with an infinitely variable speed ratio between said driving and driven members without shifting apart of those members.

2. A pair of axially aligned, spaced apart shafts, a driving member fixed to one shaft, a driven member fixed to the other shaft, each of said members having an opposing groove therearound, the cross-sectional contour of each of which grooves constitutes an arc of a common circle, both of said grooves being provided with substantially spiral teeth across their faces, means maintaining both of said members a fixed distance apart, at least one spur gear between said members to have teeth on the spur gear in constant mesh with both the driven and driving member groove teeth, a spur gear carrier on which the spur gear may rotate about its own axis, the line of said axis being angularly disposed to the axis of said shafts and remaining in a plane including the shaft axis, and means for rocking said carrier to shift said spur gear axis within said plane whereby a positive worm type drive is had with an infinitely variable speed ratio between said driving and driven members without shifting apart of those members, said spiral teeth being of that shape and angle as are produced by a revolving cutter on the spur gear axis simultaneously with rocking of the axis in said plane the teeth being thereby shaped to permit said spur gear rocking while in constant mesh therewith.

EDWARD F. KERKHOFF.